United States Patent
Jones et al.

(10) Patent No.: US 10,592,946 B2
(45) Date of Patent: Mar. 17, 2020

(54) SHOPPING CART DETECTION

(71) Applicant: Walmart Apollo, LLC, Bentonville, AR (US)

(72) Inventors: Nicholaus A. Jones, Fayetteville, AR (US); Robert J. Taylor, Rogers, AR (US); Aaron J. Vasgaard, Rogers, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 269 days.

(21) Appl. No.: 15/497,619

(22) Filed: Apr. 26, 2017

(65) Prior Publication Data

US 2017/0316476 A1 Nov. 2, 2017

Related U.S. Application Data

(60) Provisional application No. 62/329,434, filed on Apr. 29, 2016.

(51) Int. Cl.
*G06Q 30/02* (2012.01)
*G06Q 30/06* (2012.01)

(52) U.S. Cl.
CPC ..... *G06Q 30/0601* (2013.01); *G06Q 30/0201* (2013.01); *G06Q 30/0242* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 3,495,688 A | 2/1970 | Isaacks | |
| 6,464,083 B1 | 10/2002 | Harrison | |
| 6,598,790 B1 | 7/2003 | Horst | |
| 7,375,634 B2 | 5/2008 | Sprague | |
| 8,452,660 B2 * | 5/2013 | Morris | A47F 9/047 235/383 |
| 8,930,134 B2 | 1/2015 | Gu | |
| 9,091,551 B2 | 7/2015 | Hannah | |

(Continued)

OTHER PUBLICATIONS

I-Free; "i-Free Adds NFC Touchpoints to Shopping Carts"; https://www.i-free.com/en/press/news/5530; Jul. 3, 2013; pp. 1-5.

(Continued)

*Primary Examiner* — Nicholas D Rosen
(74) *Attorney, Agent, or Firm* — Fitch, Even, Tabin & Flannery LLP

(57) ABSTRACT

Apparatuses, systems, and methods are provided herein useful to determining cart movement in a shopping facility. In some embodiments, a system includes a collection device, wherein the collection device is configured to receive material from a cart that was collected throughout a shopping facility. The system can also include a measurement device, wherein the measurement device is configured to determine an amount of material that was received from the cart. The system can also include a control circuit communicatively coupled to the measurement device. The control circuit can be configured to receive, from the measurement device, an indication of the amount of material that was received from the cart.

19 Claims, 4 Drawing Sheets

(56) References Cited

U.S. PATENT DOCUMENTS

| | | | |
|---|---|---|---|
| 9,243,918 B2 | 1/2016 | Goldman | |
| 2002/0178085 A1* | 11/2002 | Sorensen | G06Q 30/02 |
| | | | 705/7.29 |
| 2004/0073489 A1 | 4/2004 | Varatharajah | |
| 2007/0016494 A1 | 1/2007 | Brown | |
| 2007/0037559 A1 | 2/2007 | Kaiserman | |
| 2008/0005036 A1* | 1/2008 | Morris | A47F 9/047 |
| | | | 705/64 |
| 2008/0079584 A1 | 4/2008 | Tabet | |
| 2008/0189170 A1 | 8/2008 | Ramachandra | |
| 2010/0089993 A1* | 4/2010 | Shin | G06Q 30/02 |
| | | | 235/375 |
| 2011/0029997 A1 | 2/2011 | Wolinsky | |
| 2014/0278655 A1 | 9/2014 | Sorensen | |
| 2016/0364786 A1* | 12/2016 | Wankhede | G06Q 30/0633 |

OTHER PUBLICATIONS

PCT; App No. PCT/US2017/029557; International Search Report and Written Opinion dated Jul. 26, 2017.

* cited by examiner

SHOPPING CART DETECTION

CROSS-REFERENCE TO RELATED APPLICATION

This application claims the benefit of U.S. Provisional Application No. 62/329,434, filed Apr. 29, 2016, which is incorporated herein by reference in its entirety

TECHNICAL FIELD

This invention relates generally to monitoring guest activity in a shopping facility and, more particularly, to determining cart movement in a shopping facility.

BACKGROUND

Typically, retailers desire to place products in easy to find locations within a shopping facility. Oftentimes products are grouped logically by type (e.g., grocery, sporting goods, clothing, etc.). Additionally, products can be classified within a group and placed near one another (e.g., in a grocery section, dairy products are placed in a first area, produces in a second area, beverages in a third area, etc.). Although retailers attempt to make products as easy to find as possible, guests may still have difficulty locating certain products. A need exists for a system that can gather and evaluate information that is indicative of whether a product is difficult to find in a shopping facility.

BRIEF DESCRIPTION OF THE DRAWINGS

Disclosed herein are embodiments of systems, apparatuses, and methods pertaining to determining cart movement in a shopping facility. This description includes drawings, wherein.

Figure 1:
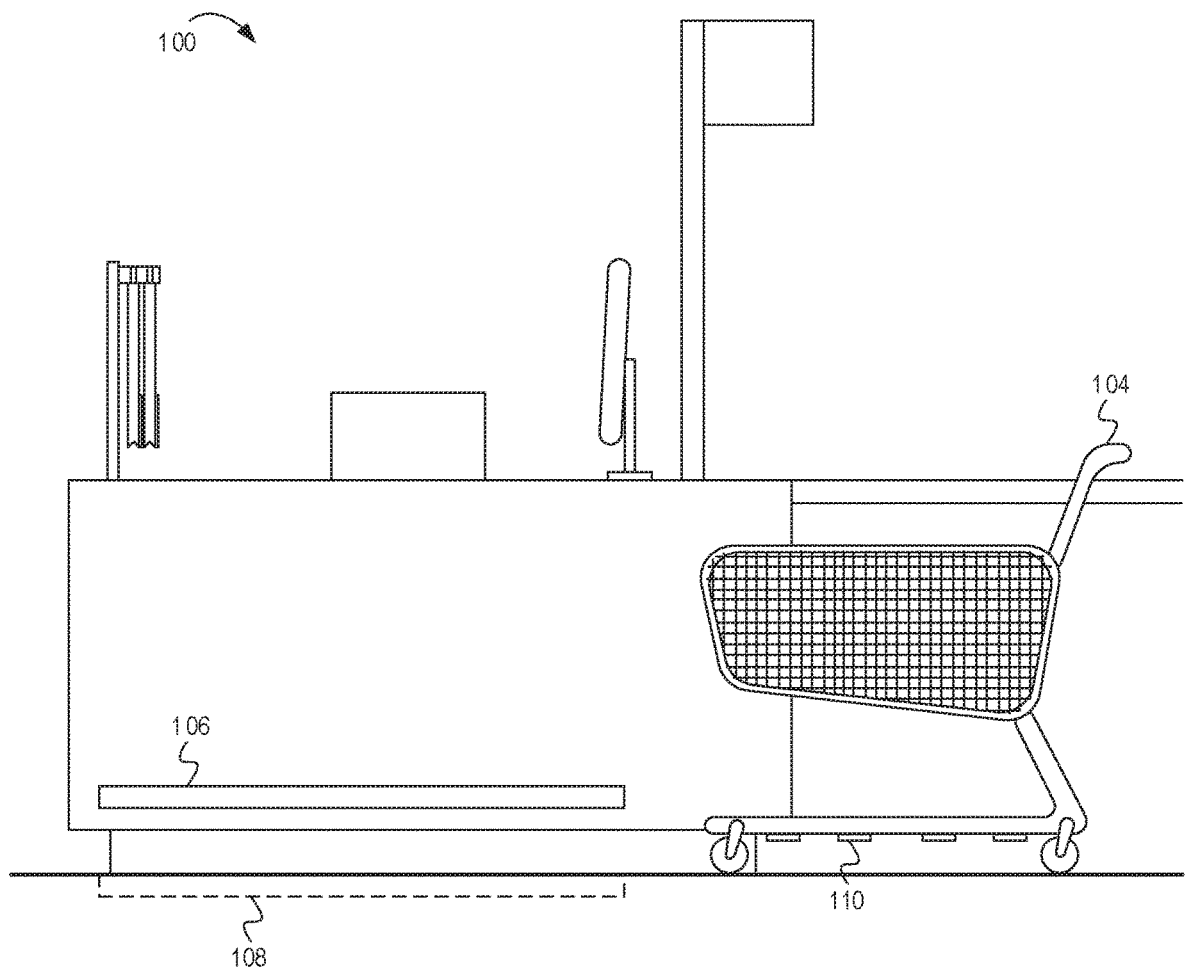
FIG. 1 depicts a terminal 100 including collection devices 106 and 108 for receiving material from a cart 104 that was collected throughout a shopping facility, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to determining cart movement in a shopping facility. In some embodiments, a system comprises a collection device, wherein the collection device is configured to receive material from a cart that was collected throughout a shopping facility. The system can also include a measurement device, wherein the measurement device is configured to determine an amount of material that was received from the cart. The system can also include a control circuit that is communicatively coupled to the measurement device. The control circuit can be configured to receive, from the measurement device, an indication of the amount of material that was received from the cart.

When products are easy to find for guests, guests have a more favorable shopping experience. Additionally, guests may purchase a greater number of products when the products are easy to find. Embodiments of the inventive subject matter include systems that can, among other things, aid in evaluating whether products in a shopping facility are located in easy to find places. This evaluation can be based on the amount of time that guests spend in the shopping facility. In one embodiment, a cart collects material as a guest shops in the shopping facility. A collection device receives the material from the cart at a terminal when the guest purchases the products. The amount of material collected by the cart (and received by the collection device) is indicative of the amount of time that the guest spent in the shopping facility. Additionally, the system can correlate the amount of time that guests spent in the shopping facility with products purchased by the guests. This information can aid in evaluating whether particular products are difficult for guests to find. For example, if the system determines that many guests purchasing a product spend significantly more time in the shopping facility than guests who do not purchase the product, it may indicate that the product is difficult to find.

FIG. 1 depicts a terminal 100 including collection devices 106 and 108 for receiving material from a cart 104, according to some embodiments. As a guest travels through the shopping facility, the cart 104 collects the material (e.g., from the floor of the shopping facility). For example, the cart 104 can include collectors 110 that collect the material. The collectors 110 will depend on the type of material being collected. For example, if the material is a ferrous material, the collectors 110 can be magnetic collectors. The greater the distance the cart 104 travels, the more material the cart 104 will collect. Presumably, the amount of material that the cart 104 collects is directly proportional to the amount of time that the guest spent in the shopping facility. Put simply, the more material the cart 104 collects, the more time the guest spent in the shopping facility. The material can be any suitable type of material that can be collected by the cart 104. For example, the material can be a particle (e.g., a plastic material, metal material, etc.), a liquid material, a chemical material, etc.).

After the guest is done shopping, the guest proceeds to the terminal 100 to purchase his/her items. The terminal 100 includes collection devices (i.e., a first collection device 106 and a second collection device 108). The first collection device 106 is located on or within the terminal 100. The second collection device 108 is located on or within the floor. Although the example terminal 100 depicted in FIG. 1 includes two collection devices (i.e., the first collection device 106 and the second collection device 108), some embodiments include greater or fewer than two collection devices. Additionally, the locations of the first collection device 106 and the second collection device 108 are provided only as examples and other suitable collection device locations exist. Regardless of the number and location of the collection devices, the collection devices 106 and 108 collect the material from the cart 104 as the cart 104 moves past the collection devices 106 and 108. After the collection devices 106 and 108 receive the material from the cart 104, a measuring device (e.g., combined with or connected to the collection devices 106 and 108) measures the amount of material received from the cart 104. The amount of material received from the cart can be used to determine or estimate the amount of time that the guest was in the shopping facility. The amount of time that the guest was in the shopping facility can be used in conjunction with other information (e.g., POS data, time or date information, guest identification information, etc.) to analyze the guest's visit to the shopping center.

Figure 2:
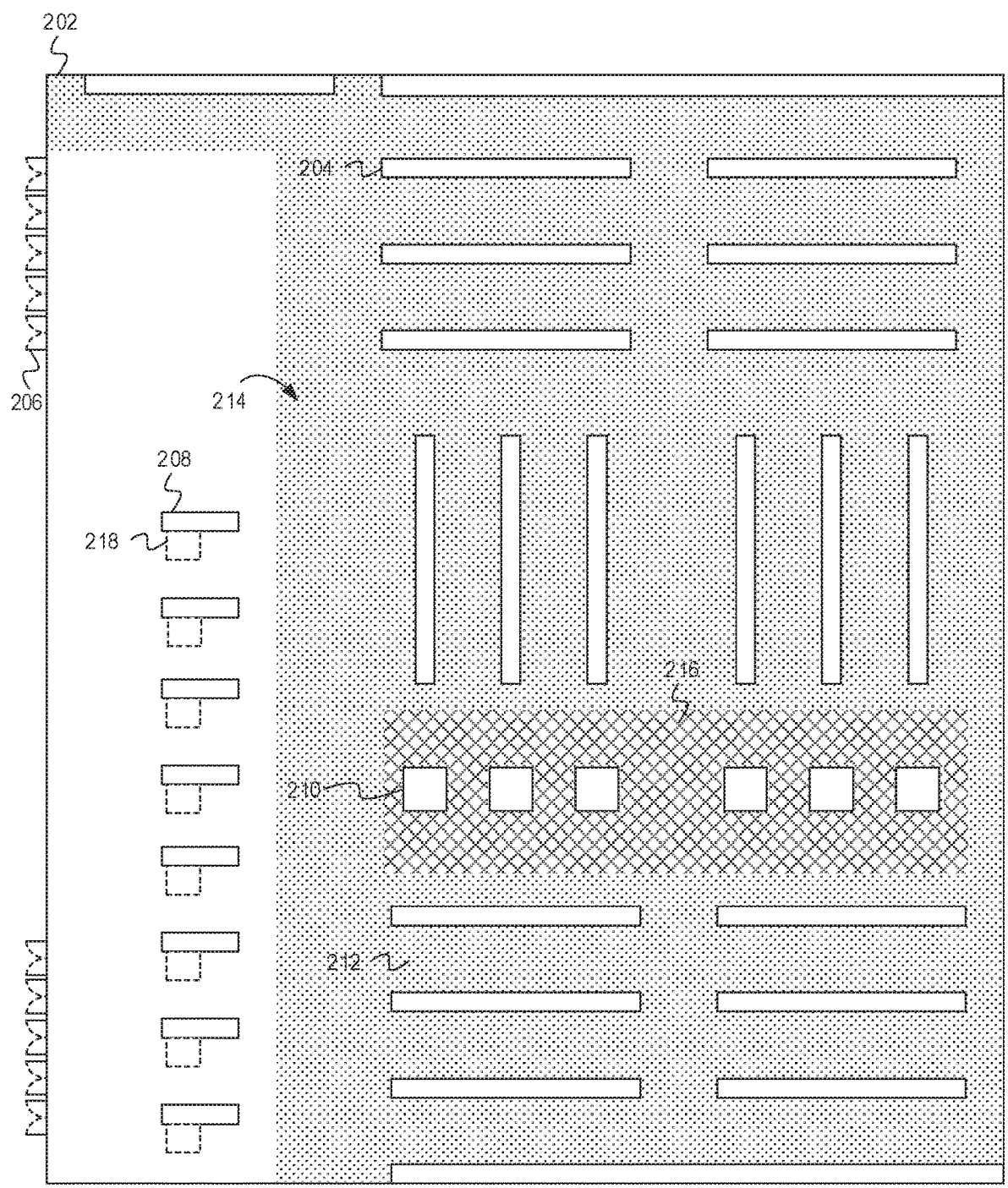
FIG. 2 depicts a shopping facility 202 in which a material has been spread throughout sections of the shopping facility 202, according to some.

While FIG. 1 and the associated text provide an overview of an example system for receiving material collected by a cart, FIG. 2 depicts an example shopping facility employing such a system.

FIG. 2 depicts a shopping facility 202 in which a material has been spread throughout sections of the shopping facility 202, according to some embodiments. The shopping facility 202 includes doors 206, terminals 208, and product display units (i.e., shelves 204 and cabinets 210). The shelves 204 form aisles 212 down which guests can walk. The material is spread in the aisles 212, as indicated by the shading 214. The material can be any type of material suitable for collection by carts (i.e., plastic, metallic, etc.). As guests push the carts through the aisles 212, the carts collect the material. In one embodiment, the material is a ferrous material and the carts include magnets for collecting the material. The magnets can be attached to the cart or the cart can be made of magnetic material. Additionally, electromagnets can be used and a power supply for the electromagnets included on the carts.

When the guests visit one of the terminals 208 to purchase the products they have selected, collection devices 218 associated with the terminals 208 receive the material from the carts. In the case of a ferrous material, the collection devices 218 can include magnets that remove the material from the carts. If the carts include electromagnets, the collection devices 218 and/or terminals 208 can include a mechanism which causes the power supply to stop supplying electricity to the electromagnets to better remove the material from the cart. Alternatively, the collection devices 218 and/or the terminals 208 can demagnetize the carts (e.g., by causing the magnetic dipoles to no longer be aligned). In the case of plastic material, the collection devices 218 can be electrically charged so as to encourage the material to move from the cart to the collection devices 218. Additionally, the terminals 208 and/or the collection devices 218 can ground the carts as the carts reach the terminals 208 and/or the collection devices 218 to better remove the material from the carts.

In some embodiments, different types of material can be spread in different areas of the shopping facility 202. For example, as depicted in FIG. 2, a second material is spread in a region indicated by crosshatching 216. The second material is spread around the cabinets 210. The second material can have a different type, size, color, weight, chemical structure, or any other suitable characteristic, than the material spread through other portions of the shopping facility 202. In some embodiments each terminal 208 may have a separate collection device 218 for each type of material. For example, each terminal may have a magnetic collection device for receiving ferrous material from the carts and an electrically charged collection device for receiving plastic material from the carts. Spreading different materials throughout the shopping facility 202 can provide information about a guest's activity within the shopping facility 202. For example, if a guest's cart only contains the first material, then the guest did not browse the products located on the cabinets 210. This information can help in evaluating advertising and product placement strategies. Additionally, the relative amounts of the first material and the second material can be compared. For example, if the guest's cart contains an amount of the first material that is less than the average cart but significantly more of the second material than the average cart, this may indicate that the guest had to search the cabinets 210 for a significant period of time to find his/her desired product.

In some embodiments, the material may only be spread in certain areas of the shopping facility. For example, the product may only be spread around an area of interest, such as the cabinets 210 (i.e., the area indicated by the crosshatching 216 and not the area indicated by the shading 214). In such embodiments, a proportion of guests that visited the area near the cabinets 210 can be determined. Additionally, if the same product is located in an area in which the material had been spread (e.g., a promotional area) and an area in which the material has not been spread (e.g., the location in which the product is usually presented for sale), POS data can be used in conjunction with the presence (or alternatively a lack thereof or negligible amount) of the material on the cart to determine whether the guest collected the product from the area in which the material had been spread or the area in which the product had not been spread. This can provide insight as to the proportion of guests that collected the product from the promotional area. Additionally, the area in which the material is spread can also be changed periodically (e.g., daily, weekly, seasonally, when products are moved in the shopping facility, etc.).

Figure 3:
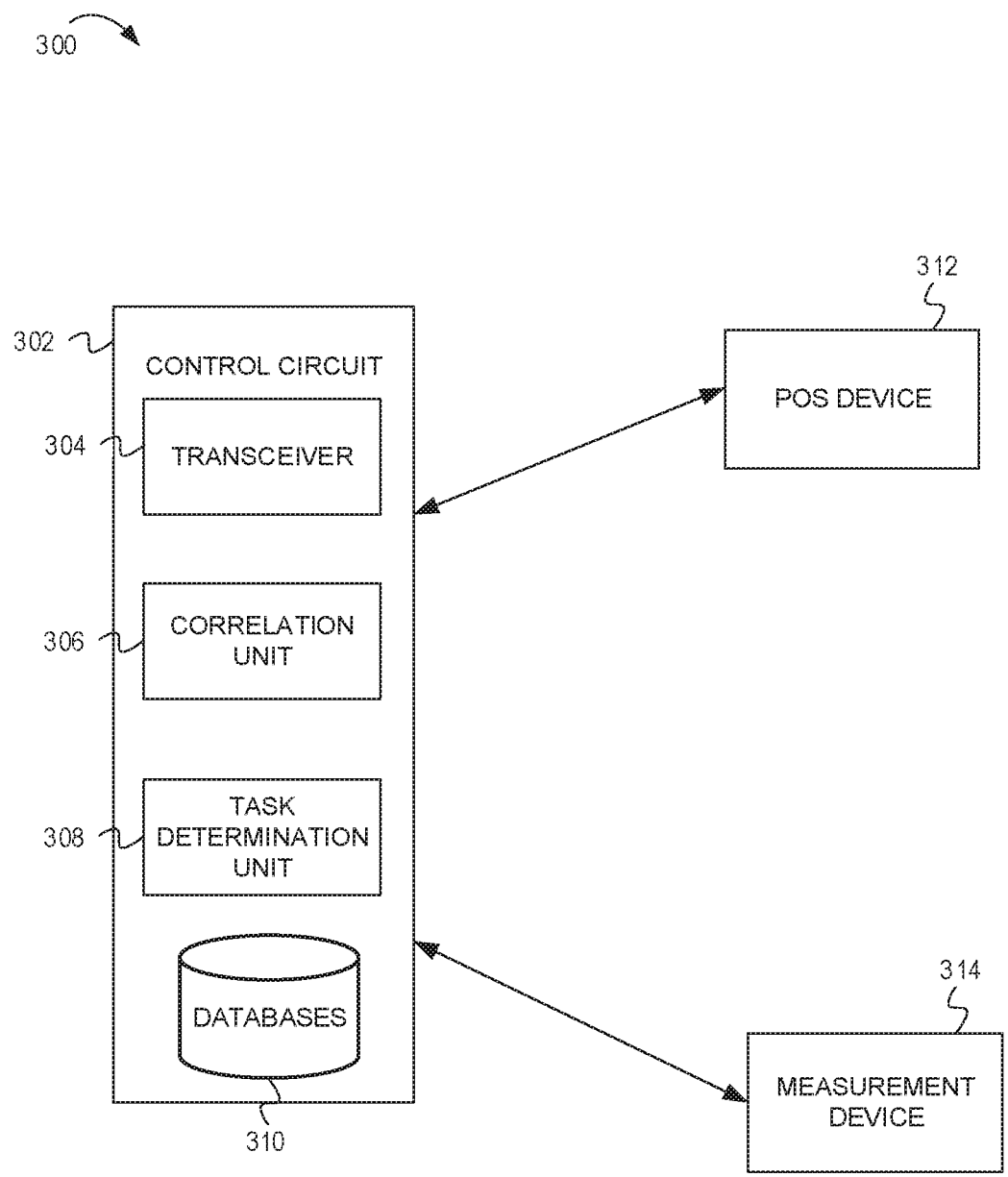
FIG. 3 is a block diagram depicting an example system 300 for monitoring cart movement in a shopping facility, according to some embodiments.13

While FIG. 2 depicts a shopping facility in which a material to be collected by carts has been spread, FIG. 3 depicts a block diagram of a system that can be used to evaluate information relating to the amount of material collected by a cart in a shopping facility.

FIG. 3 is a block diagram depicting an example system 300 for monitoring cart movement in a shopping facility, according to some embodiments. The system 300 includes a control circuit 302, a point of sale (POS) device 312, and a measurement device 314. The POS device 312 and the measurement device 314 are in communication with the control circuit 302. The POS device 312 and the measurement device 314 provide information to the control circuit 302. The POS device tracks sales data (e.g., transaction numbers, products purchased during a transaction, information about transactions, etc.). The measurement device 314 measures an amount of material collected from carts at a terminal. The measurement device can measure the material collected based on induction changes on a collection device, changes in a magnetic field on a collection device, weight of the material on a collection device, or any other suitable technique. In some embodiments, the measurement device 314 does not determine the amount of material received from the cart. In such embodiments, the measurement device 314 detects only the presence of material (i.e., did the cart collect any material while the guest shopped for products in the shopping facility).

The control circuit 302 includes a transceiver 304, a correlation unit 306, a task determination unit 308, and databases 310. The transceiver 304 receives data from, and transmits data to, the POS device 312 and the measurement device 314 (as well as other devices not shown). For example, the transceiver 304 receives POS data from the POS device 312 and an indication of an amount of the material from the measurement device 314.

The correlation unit 306 determines or estimates an amount of time that a guest was in the shopping facility based on the amount of material collected by the cart. In some embodiments, the correlation unit determines or estimates the amount of time that a guest was in the shopping facility based on data stored in the databases 310. For example, the databases 310 can include experimental associations between the amount of material and the amount of time, historical associations between the amount of material and the amount of time, and/or calculated associations between the amount of material and the amount of time. The databases 310 can also include information specific to the shopping facility, such as a concentration of material in the shopping facility, locations of the material within the shopping facility, type of material spread throughout the shopping facility, etc. The correlation unit 306 can use these values and the associations stored in the databases 310 to better determine or estimate the amount of time that a guest was in the shopping facility. The correlation unit 306 can also correlate the determined or estimated amount of time with the POS data. For example, the correlation unit can compare current data (i.e., an amount of time for a specific guest and POS data for the specific guest) with past guests (e.g., based on the amount of time, time of day, location, items purchased, etc.). The correlation unit 306 can store these comparisons in the databases 310. In some embodiments, the databases 310 also include comparisons from other shopping facilities.

The task determination unit 308 analyzes the comparisons made by the correlation unit and determines a task to perform. For example, if the material is placed only by a specific product and the correlation unit determined that several guests passed the product but did not purchase the product, the task determination unit 308 can determine that a restocking task should be performed based on the assumption that the product is either not stocked or improperly stocked on the product display unit. As another example, if the correlation unit 306 finds an association between a specific product and guests spending a longer than expected time in the shopping facility (e.g., based on the number of items purchased), the task determination unit 308 can determine that an investigatory task should be performed to determine whether the specific product should be moved to a new location. The task to perform can be a general task management task (e.g., zoning), a modular task (detailed work on a small section of the shopping facility), a product management task, a facilities management task, a merchandising task (e.g., investigate new marketing and/or prices), or any other task in the shopping facility. In some embodiments, the databases 310 include a list of tasks and trigger conditions for the tasks. In such embodiments, the task determination unit 308 determines the task to perform by referencing the databases 310.

Figure 4:
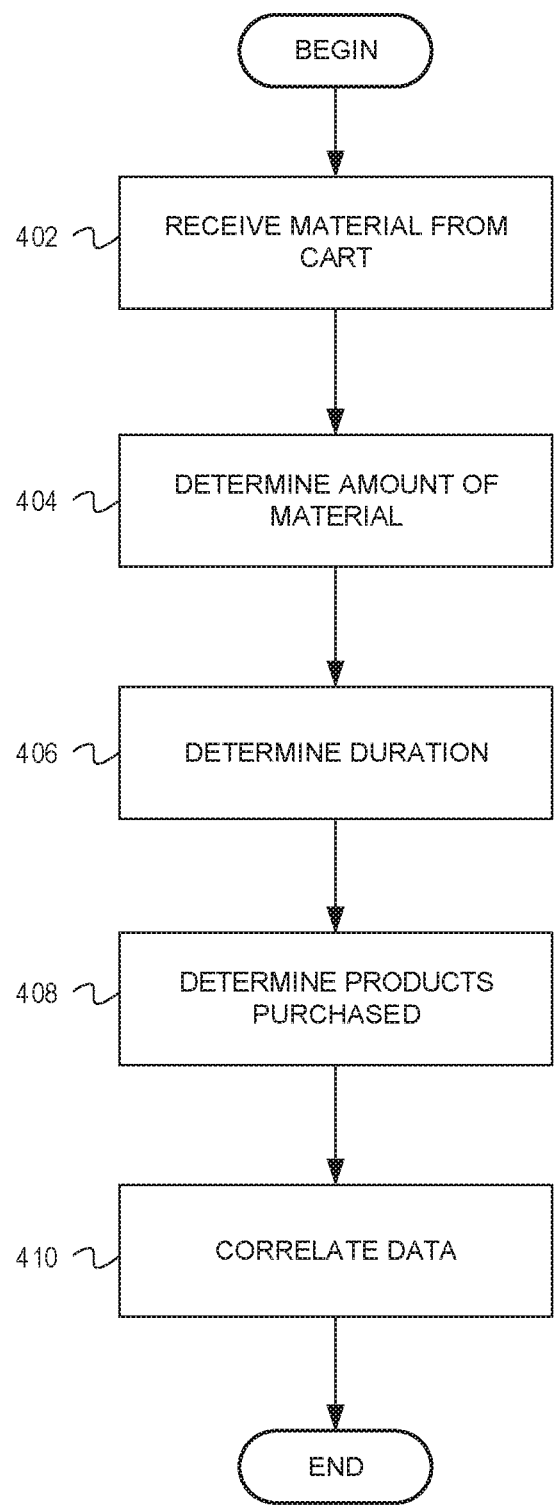
FIG. 4 is a flow chart depicting example operations for determining cart movement in a shopping facility, according to some embodiments.

While FIG. 3 depicts a block diagram of a system that can be used to evaluate information relating to the amount of material collected by a cart in a shopping facility, FIG. 4 is a flow chart depicting example operations for determining an amount of time spent by a guest in a shopping facility and correlating the amount of time with other data.

FIG. 4 is a flow chart depicting example operations for determining cart movement in a shopping facility, according to some embodiments. The flow begins at block 402.

At block 402, material is received from a cart. For example, the material is received by a collection device near a terminal. As a guest moves throughout a shopping facility, his/her cart collects material from the shopping facility. The collection device receives this material from the cart when the guest approaches the terminal. The flow continues at block 404.

At block 404, an amount of material is determined. For example, a measurement device can determine the amount of material. The measurement device can measure the material collected based on induction changes on a collection device, changes in a magnetic field on a collection device, weight of the material on a collection device, or any other suitable technique. In some embodiments, the measurement device 314 does not determine the amount of material received from the cart. In such embodiments, the measurement device 314 detects only the presence of material (i.e., did the cart collect any material while the guest shopped for products in the shopping facility). The flow continues at block 406.

At block 406, a duration (i.e., time spent in the shopping facility) is determined. For example, the duration can be determined by a control circuit. The control circuit determines the duration based on the amount of material received by the collection device. The control circuit can determine the duration based on historical and/or experimental values. The values can be specific to the shopping facility or compiled from a plurality of shopping facilities. In some embodiments, the duration is an estimate based on the available information. The flow continues at block 408.

At block 408, products purchased by the guest are determined. In some embodiments, the control circuit determines the products purchased by the guest. The control circuit can determine the products purchased by the guest based on POS data. The POS data can include transaction information, such as an indication of the products in each transaction, an identity of a guest associated with each transaction, date and/or time information associated with each transaction, etc.). The flow continues at block 410.

At block 410, the data is correlated. For example the control circuit can correlate the data. The control circuit can correlate the duration of a current guest with the products purchased, correlate the products purchased with the presence (or absence) of material on the cart, and/or correlate the duration with a total number of products purchased. Additionally, in some embodiments, the control circuit can determine a task to perform based on the correlated data.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

In some embodiments, a system comprises a collection device, wherein the collection device is configured to receive material from a cart that was collected throughout a shopping facility. The system can also include a measurement device, wherein the measurement device is configured to determine an amount of material that was received from the cart. The system can also include a control circuit that is communicatively coupled to the measurement device. The control circuit can be configured to receive, from the measurement device, an indication of the amount of material that was received from the cart.

In some embodiments, a method comprises receiving, at a collection device of a shopping facility, material that was collected throughout the shopping facility by a cart. The method can also include determining, by a measurement device, an amount of material received from the cart. The method can also include determining, by a control circuit, an indication of items associated with the cart that were purchased.

In some embodiments, a method comprises receiving, at a collection device of a shopping facility, material that was collected throughout the shopping facility by a cart. The method can also include determining, by a measurement device, an amount of material that was received from the cart. The method can also include determining, by a control circuit, an approximate time that the cart was in the shopping facility based, at least in part, on the amount of material that was received from the cart. The method can also include determining, by the control circuit, an indication of items associated with the cart that were purchased.

What is claimed is:

1. A system for monitoring cart activity in a shopping facility, the system comprising:
   a cart, wherein the cart is configured to accumulate a ferrous material while the cart traverses the shopping facility, and wherein the material is distributed about the shopping facility;
   a terminal, wherein the terminal includes,
      a point-of-sale (POS) device, wherein the POS device is configured to collect sales data for a transaction associated with the cart;
      a collection device including a magnet, wherein the collection device is configured to receive the material from the cart that was collected throughout the shopping facility;
      a measurement device including a scale, wherein the measurement device is configured to measure an amount of the material that was received from the cart; and
   a control circuit communicatively coupled to the terminal, the control circuit configured to;
      receive, from the terminal, an indication of the amount of the material that was received from the cart;
      receive, from the terminal, the sales data for the transaction associated with the cart; and
      correlate the sales data for the transaction associated with the cart and the amount of the material that was received from the cart.

2. The system of claim 1, wherein the sales data for the transaction associated with the cart includes an indication of items associated with the cart that were purchased, and wherein the control circuit is further configured to:
   determine an approximate time that the cart was in the shopping facility based, at least in part, on the indication of the amount of material that was received from the cart; and
   determine that the cart was in the shopping facility for a greater time than expected based, at least in part, on the indication of items associated with the cart that were purchased and the approximate time the cart was in the shopping facility.

3. The system of claim 2, wherein the control circuit is further configured to:

compare the indication of items associated with the cart that were purchased with indications of items associated with other carts;
   determine, based on the comparison, one or more common items between the indication of items associated with the cart that were purchased and the indications of items associated with other carts.

4. The system of claim 3, wherein the control circuit is further configured to:
   determine, based on the one or more common items, a task to perform; and
   transmit an indication of the task to perform.

5. The system of claim 1, wherein the material that was collected throughout the shopping facility was collected at one or more predetermined locations throughout the shopping facility, and wherein the amount of material that was received from the cart is negligible, the control circuit further configured to:
   determine, based on the sales data for the transaction associated with the cart, an indication of items associated with the cart that were purchased;
   determine, from the indication of items associated with the cart that were purchased, that one item is located at a first location and a second location, wherein the first location is one of the one or more predetermined locations throughout the shopping facility and the second location is a different location;
   determine that the one item was retrieved from the second location based, at least in part, on the amount of material that was received from the cart being negligible; and
   determine a task to perform based, at least in part, on the determination that the one item was retrieved from the second location.

6. The system of claim 1, wherein the material that was collected throughout the shopping facility was collected at one or more predetermined locations throughout the shopping facility, the control circuit further configured to:
   determine, based on the sales data for the transaction associated with the cart, an indication of items associated with the cart that were purchased;
   determine that items associated with the one or more predetermined locations are not included in the indication of items associated with the cart that were purchased; and
   determine a task to perform based, at least in part, on the determination that the items associated with the one or more predetermined locations are not included in the indication of items associated with the cart that were purchased.

7. A method for monitoring cart activity in a shopping facility, the method comprising:
   accumulating, by a cart while the cart traverses the shopping facility, a ferrous material, wherein the material is distributed about the shopping facility;
   collecting, by a point-of-sale device of a terminal, sales data for a transaction associated with the cart;
   receiving, at a collection device of the terminal, the material that was collected throughout the shopping facility by the cart;
   measuring, by a measurement device including a scale, an amount of the material received from the cart;
   determining, by a control circuit based on the sales data for the transaction associated with the cart, an indication of items associated with the cart that were purchased; and correlating, by the control circuit, the items associated with the cart that were purchased and the amount of the material that was received from the cart.

8. The method of claim 7, further comprising:
determining, by the control circuit, an approximate time that the cart was in the shopping facility based, at least in part, on the amount of the material received from the cart; and
determining, by the control circuit, that the cart was in the shopping facility for a greater time than expected based, at least in part, on the indication of items associated with the cart that were purchased and the approximate time that the cart was in the shopping facility.

9. The method of claim 8, further comprising:
comparing, by the control circuit, the indication of items associated with the cart that were purchased with indications of items associated with other carts; and
determining, by the control circuit, one or more common items between the indication of items associated with the cart that were purchased and the indications of items associated with other carts.

10. The method of claim 9, further comprising:
determining, by the control circuit based on the one or more common items, a task to perform; and
transmitting, by the control circuit via a communications network, an indication of the task to perform.

11. The method of claim 7, wherein the collection device includes a magnet.

12. The method of claim 7, wherein the material that was collected throughout the shopping facility was collected at one or more predetermined locations throughout the shopping facility, and wherein the amount of material that was received from the cart is negligible, the method further comprising:
determining, by the control circuit based on the indication of items associated with the cart that were purchased, that one item is located in a first location and a second location, wherein first location is one of the one or more predetermined locations throughout the shopping facility and the second location is a different location;
determining, by the control circuit, that the one item was retrieved from the second location based, at least in part, on the amount of material that was received from the cart was negligible; and
determining, by the control circuit, a task to perform based, at least in part, on the determining that the one item was retrieved from the second location.

13. The method of claim 7, wherein the material that was collected throughout the shopping facility was collected at one or more predetermined locations throughout the shopping facility, and further comprising:
determining, by the control circuit, that items associated with the one or more predetermined locations are not included in the indication of items associated with the cart that were purchased; and
determining, by the control circuit, a task to perform based, at least in part, on the determining that the items associated with the one or more predetermined locations are not included in the indication of items associated with the cart that were purchased.

14. A method for monitoring cart activity in a shopping facility, the method comprising:
accumulating, by a cart while the cart traverses the shopping facility, a ferrous material, wherein the material is distributed about the shopping facility;
collecting, by a point-of-sale device of a terminal, sales data for a transaction associated with the cart;
receiving, at a collection device of the terminal, the material that was collected throughout the shopping facility by a cart;
measuring, by a measurement device, an amount of the material that was received from the cart;
determining, by a control circuit, an approximate time that the cart was in the shopping facility based, at least in part, on the amount of the material that was received from the cart; and
determining, by the control circuit based on the sales data for a transaction associated with the cart, an indication of items associated with the cart that were purchased.

15. The method of claim 14, further comprising:
determining that the approximate time that the cart was in the shopping facility is longer than an anticipated time based, at least in part, on the indication of items associated with the cart that were purchased; and
determining one or more items included in the indication of items associated with the cart that were purchased that are common to other carts that were in the shopping facility longer than anticipated.

16. The method of claim 15, further comprising:
determining a task to perform based, at least in part, on the one or more items included in the indication of items associated with the cart that were purchased that are common to other carts that were in the shopping facility longer than anticipated.

17. The method of claim 14, wherein the material is a ferrous material, the cart is magnetized, and the collection device includes a magnet.

18. The method of claim 14, further comprising:
demagnetizing the cart electrically at the terminal to receive the material that was collected throughout the shopping facility.

19. The method of claim 14, further comprising:
recording, in a database, the approximate time that the cart was in the shopping facility and the indication of items associated with the cart that were purchased.

* * * * *